(12) United States Patent
Arisawa

(10) Patent No.: US 7,311,246 B2
(45) Date of Patent: Dec. 25, 2007

(54) METHOD AND SYSTEM FOR TRANSMITTING ELECTRONIC VALUE INFORMATION

(75) Inventor: Shigeru Arisawa, Tokyo (JP)

(73) Assignee: Sony Corporation, Tokyo (JP)

( * ) Notice: Subject to any disclaimer, the term of this patent is extended or adjusted under 35 U.S.C. 154(b) by 273 days.

(21) Appl. No.: 11/283,387

(22) Filed: Nov. 18, 2005

(65) Prior Publication Data

US 2006/0116968 A1 Jun. 1, 2006

(30) Foreign Application Priority Data

Nov. 26, 2004 (JP) ............................ P2004-342368

(51) Int. Cl.
*G07F 19/00* (2006.01)
(52) U.S. Cl. ..................... 235/379; 235/380; 705/39
(58) Field of Classification Search ................ 235/376; 902/1, 2; 705/67, 71; 340/5.8; 380/255
See application file for complete search history.

(56) References Cited

U.S. PATENT DOCUMENTS

| | | | |
|---|---|---|---|
| 5,696,827 A | 12/1997 | Brands | |
| 6,299,062 B1 * | 10/2001 | Hwang | ........................ 235/379 |
| 6,321,213 B1 * | 11/2001 | Ito et al. | ........................ 705/39 |
| 2002/0062440 A1 | 5/2002 | Akama | |
| 2002/0161723 A1 | 10/2002 | Asokan et al. | |
| 2004/0081321 A1 | 4/2004 | Struik | |
| 2004/0143730 A1 | 7/2004 | Wen et al. | |
| 2006/0097037 A1 * | 5/2006 | Sakamura et al. | .......... 235/380 |

FOREIGN PATENT DOCUMENTS

| | | |
|---|---|---|
| EP | 0749078 | 12/1996 |
| JP | 2003-141429 | 5/2003 |
| JP | 2004320229 | 11/2004 |
| WO | 9925093 | 5/1999 |
| WO | 0184763 | 4/2000 |

OTHER PUBLICATIONS

Praeger Cheryl E., Chapter 5 Data Encryption Standard, Oct. 27, 2001 (online), (retrieved on Aug. 22, 2006). Retrieved from the Internet <URL: http://www.maths.uwa.edu.au/~praeger/teaching/3CC/WWW/chapter5.html> See point 5.5.

* cited by examiner

*Primary Examiner*—Seung Ho Lee
(74) *Attorney, Agent, or Firm*—Bell, Boyd & Lloyd LLP

(57) ABSTRACT

A method and system of transmitting electronic value information between terminals. The method includes the steps of: authenticating each other between a transmission source terminal and a destination terminal; sharing authentication for common information obtained by the authentication; encrypting data including the electronic value information to be transmitted; transferring the encrypted electronic value information to the destination terminal when the terminals are recognized with each other; temporarily invalidating the electronic value information left in the source terminal; transmitting reception confirmation to the source terminal when the destination terminal completes reception of the electronic value information; deleting the invalidated electronic value information left in the source terminal when the reception confirmation is received by the source terminal; transmitting validation information to the destination terminal after the deletion of the electronic value information in order to validate the electronic value information; receiving and validating the electronic value information by the destination terminal.

17 Claims, 10 Drawing Sheets

METHOD AND SYSTEM FOR TRANSMITTING ELECTRONIC VALUE INFORMATION

CROSS REFERENCE TO RELATED APPLICATIONS

The present invention claims priority to Japanese Patent Application JP 2004-342368 filed in the Japanese Patent Office on Nov. 26, 2004, the entire contents of which are being incorporated herein by reference.

BACKGROUND

The present invention relates to a method and system for transmitting electronic value information, in which value information called an electronic value is transmitted and received using a noncontact (or contact) IC card having a memory function for holding data and capable of reading data from and writing data into the memory in a noncontact manner or using an electronic system provided with the IC card.

It is commonly practiced to conduct identification of a user, authentication processing, etc., at the time of using a specific service using a personal identification number or a password. For example, when a user uses a cash card or a credit card at a financial institution, such as a bank, the user is prompted to enter a personal identification number or a password at a banking terminal such as a cash dispenser, etc. If confirmation is made that the user has entered a correct personal identification number or a correct password, the user is allowed to perform a financial transaction such as money transfer, payment, money receipt, at the like.

A storage medium, such as a magnetic stripe, etc., disposed on a cash card, etc., has a small storage capacity, and is provided with only a storage area for an exclusive use for that bank. Also, the above-described personal information such as a personal identification number, a password, etc., can be accessed if the storage medium, such as a magnetic stripe, etc., can be read out. It is therefore hard to say that the protection against forgery and unauthorized use has been sufficiently provided.

Accordingly, in recent years, cards (in the following, called IC cards), in which an IC chip accommodating a larger amount of information than a magnetic stripe disposed on a cash card or a credit card is embedded, have appeared in order to protect forgery, etc. IC cards include contact IC cards having an electrical contact and noncontact IC cards capable of reading and writing data through radio transmission.

In the case of a noncontact IC card, an IC card reader/writer, which reads and writes information from and to the IC card, can access the IC card held above by a user without contacting by electromagnetic inductive coupling. Such an IC card reader/writer is installed, for example, at a shop, on a cash dispenser, at a gateway of a concert hall, at a ticket gate of a station, etc.

With such an IC card, personal identification or authentication processing is performed between the IC card and the IC card reader/writer by user's input of a personal identification number into the IC card reader and matching the input personal identification number and the personal identification number stored in the IC card. If the personal identification or authentication processing has been successful, for example, it becomes possible to use an application stored in the IC card. Applications held in an IC card include value information, which is so-called an electronic value, for example, electronic money, an electronic ticket, a prepaid voucher, etc.

In recent years, an IC card reader/writer capable of being connected to an information processing terminal such as a personal computer, a PDA (Personal Digital Assistant), a mobile phone, etc., or an electronic system having a main unit to which an IC chip is embedded are being provided. In this manner, an information processing terminal to which an IC card reader/writer can be connected, or an information processing terminal containing an IC chip capable of contact or noncontact communication can perform various application services using an IC card (IC chip). For example, it is possible to perform user interaction on an IC card by an information processing terminal using an input part such as a keyboard on the information processing terminal and a user interface such as a display unit, etc. Also, if an IC card is connected to a mobile phone, it is possible to exchange information stored in the IC card through a telephone communication network.

For example, it is possible to perform electronic settlement for electronic money stored in an IC card, an electronic ticket, a prepaid voucher, etc., electronic value processing such as settlement by a prepaid-card type, and the other various services from an information processing terminal possessed by a user.

However, an electronic system such as an information processing terminal containing an IC chip capable of storing an electronic value is sometimes subjected to a model change by a machine failure, replacement for a high-performance model, etc. In this case, it is necessary to transfer the contents stored in the IC chip directly to an IC chip of a new device after the replacement so that the content (an electronic value) is transferred exactly. Thus, the electronic value and the personal information should not be exposed and should not be left in another terminal.

Also, when value information in an IC chip is transferred, there is a risk of losing an electronic value, and a risk of an electronic value being replicated illegally and altered by a communication trouble or a machine failure.

For example, when an information processing terminal containing an IC chip is a mobile phone, if an electronic value can be transmitted and received between terminals, a communication company is often different from a service provider which provides an electronic value such as electronic money, an electronic ticket, etc. Accordingly, a communication company does not have key information and a logic which are necessary for accessing an electronic value, and thus there are a lot of inconveniences for processing the electronic value. Also, if a communication company undertakes to transfer an electronic value between the terminals, the communication company providing electronic value services assumes the responsibility for electronic values and key information. Also, for service providers providing electronic values, it is not preferable to disclose key information and a logic, which become the basis of the services, to a communication company.

A technique for securely transferring an electronic value such as electronic money, an electronic ticket, etc. held in an IC card or an IC chip is disclosed (for example, refer to Japanese Unexamined Patent Application Publication No. 2003-141429). In this technique, there are provided a value-information service apparatus for securely maintaining value information itself to be transferred, a key for accessing this value information, and the logic thereof; and a value-information transfer service apparatus for relaying the upload of value information stored in the information recording medium of the transfer source to the value-information service apparatus and the download of value information from the value-information service apparatus to a information recording medium of a transfer destination.

Incidentally, when an IC chip storing value information is contained in a electronic system such as a mobile phone, etc., if a model of the system is changed for some reason, it is necessary to transfer the value information, the personal information, etc., stored in the IC chip between electronic systems, that is to say, between the IC chips. User's personal information and an electronic value such as electronic money and an electronic ticket, etc., are necessary to be transferred exactly in the same manner between the systems or between a host providing an electronic value service and a terminal connected to the host while keeping secret.

In a card or an electronic system which contains an IC chip, when an electronic value such as electronic money, etc., is transferred from a sender to a recipient, if an electronic value of the sender is simply replicated to the recipient, there is a risk of allowing to make copies to a plurality of recipients, to make alterations, etc. Also, if a problem occurs at communication time, there is a possibility of losing the electronic value itself.

In the technique disclosed in the above-described patent document, a terminal receiving electronic value service is enabled to securely hold value information itself to be transferred, a key for accessing the value information, and the logic thereof. Moreover, the data transfer system is provided with an apparatus which relays value information stored in the information recording medium of the transmission source terminal when uploading the value information to the value-information service apparatus and value information from the value-information service apparatus to the information recording medium of the transmission destination terminal when downloading the value information to the value-information service apparatus. However, the above-described problem remains, because value information passes through a third apparatus.

SUMMARY

Accordingly, the present invention has been proposed in view of the above-described known situation. It is desirable to provide a method and system for transmitting electronic value information, which allows assuring the transfer of electronic value information to a recipient without fail.

According to an embodiment of the present invention, there is provided a method of transmitting electronic value information for transferring electronic value information between terminals, the method including the steps of: authenticating each other between a transmission source terminal being a transmission source of the electronic value information and a transmission destination terminal being a transmission destination using common authentication information; sharing authentication for sharing common information obtained by the authentication between the transmission source terminal and the transmission destination terminal; encrypting data including the electronic value information to be transmitted from the transmission source terminal to the authenticated transmission destination terminal; transferring value information for transmitting the electronic value information encrypted in the step of encrypting to the transmission destination terminal when the transmission source terminal and the transmission destination terminal are recognized with each other in the step of authenticating; temporarily invalidating the electronic value information left in the transmission source terminal; transmitting reception confirmation for returning reception confirmation to the transmission source terminal when the transmission destination terminal completes reception of the electronic value information; deleting value information for deleting the invalidated electronic value information left in the transmission source terminal when the transmission source terminal receives the reception confirmation; transmitting validation information to the transmission destination terminal after the deletion of the electronic value information in order to validate the electronic value information; and validating value information for receiving the validation information and validating the electronic value information by the transmission destination terminal.

Here, the step of encrypting preferably encrypts all the data transmitted and received between the transmission source terminal and the transmission destination terminal using the common information shared in the step of sharing authentication. Also, the step of deleting value information preferably deletes electronic value information left in the transmission source terminal before the transfer and all the information related to the electronic value information. Thus, the protection effect of the electronic value information is increased.

Also, in the method of transmitting electronic value information according to the present invention, the method may further include the step of encrypting value information for encrypting the electronic value information using the authentication information, wherein electronic value information encrypted in the step of encrypting value information is transmitted to the transmission destination terminal in the step of transferring value information.

Also, a common key determined between electronic-value-information transfer terminals may be used as the authentication information, and all the data transmitted and received in the step of authenticating may be encrypted by the common key. Furthermore, in the step of authenticating, the transmission source terminal and the transmission destination terminal may authenticate with each other using a predetermined public key, unique information provided for the transmission source terminal being a transmission source and each terminal of the transmission destination terminals, and then the transmission source terminal may generate a session key, and the generated session key may be used as authentication information.

Also, in the method of transmitting electronic value information according to the present invention, in the step of deleting value information, the invalidated electronic value information left in the transmission source terminal and all the information related to the electronic value information may be deleted, and then in the step of transmitting validation information, validation information for validating the electronic value information may be transmitted to the transmission destination terminal.

Also, in the method of transmitting electronic value information according to the present invention, the method further includes the step of determining disruption for determining communication disruption between the transmission source terminal and the transmission destination terminal, wherein the transmission source terminal and the transmission destination terminal are provided with unique information, a counter indicating which processing stage the processing is in and the unique information are transmitted and received with each other in the steps of authenticating, transferring value information, and transmitting reception confirmation, and completion notification indicating completion of the steps of authenticating, transferring value information, and transmitting reception confirmation is transmitted and received, in the step of determining disruption, when one of the terminals fails to receive the completion notification, a determination is made that communication between the terminals is disrupted and a step, indicated by the counter, of which the completion notification has failed to be received between the terminals having the unique information is repeated.

Also, according to an embodiment of the present invention, there is provided a method of transmitting electronic value information for transferring electronic value information between terminals, the method including the steps of: authenticating each other between a transmission source terminal being a transmission source of the electronic value information and a transmission destination terminal being a transmission destination using common authentication information; sharing authentication for sharing common information obtained by the authentication between the transmission source terminal and the transmission destination terminal; dividing the electronic value information into transmission units having no meaning as electronic value information; transferring value information for transmitting one transmission unit generated in the step of dividing the electronic value information when the terminals are recognized with each other in the step of authenticating; transmitting reception confirmation for returning reception confirmation to the transmission source terminal when the transmission destination terminal receives the transmission unit; deleting unit information for deleting the one transmission unit left in the transmission source terminal when the transmission source terminal receives the reception confirmation; wherein when the transmission source terminal receives the reception confirmation, a next transmission unit subsequent to the one transmission unit is transmitted, when the transmission destination terminal receives the next transmission unit, a next transmission unit left in the transmission source terminal is deleted, and when the transmission units of the electronic value information are completely transferred, the electronic value information is reconstructed.

Thus, electronic value information is reliably transferred from the transmission source terminal to the transmission destination terminal, and illegal replication of the electronic value information and loss of the electronic value information are prevented.

At this time, the step of transferring value information for transmitting the transmission units divided in the step of dividing the electronic value information to the transmission destination terminal in sequence, the step of transmitting reception confirmation, and the step of deleting unit information include the step of determining disruption for determining communication disruption between the transmission source terminal and the transmission destination terminal, the transmission source terminal and the transmission destination terminal are provided with unique information to each terminal, the step of transferring value information and the step of transmitting reception confirmation transmit and receive a counter for distinguishing a transmission unit and unique information of the terminal with each other, and the transmission destination terminal transmits completion notification indicating completion of the reception of each transmission unit to the transmission source terminal. When the transmission source terminal fails to receive the completion notification in the step of transferring value information and the step of transmitting reception confirmation, the step of determining disruption determines an occurrence of communication disruption between the terminals, and the step of transferring a transmission unit, indicated by a counter, having the completion notification failed to be received is repeated.

Also, according to an embodiment of the present invention, there is provided a method of transmitting electronic value information for transferring electronic value information between terminals, the method including the steps of: authenticating each other between a transmission source terminal being a transmission source of the electronic value information and a transmission destination terminal being a transmission destination using common authentication information; sharing authentication for sharing common information obtained by the authentication between the transmission source terminal and the transmission destination terminal; generating a random number; encrypting value information for encrypting the electronic value information using the random number generated in the step of generating a random number when the terminals are recognized with each other in the step of authenticating; encrypting data including the electronic value information to be transmitted from the transmission source terminal to the authenticated transmission destination terminal; transferring value information for transmitting the electronic value information encrypted in the step of encrypting when the transmission source terminal and the transmission destination terminal are recognized with each other in the step of authenticating; invalidating for temporarily invalidating or deleting the electronic value information left in the transmission source terminal; transmitting reception confirmation for returning reception confirmation to the transmission source terminal when the transmission destination terminal completes reception of the electronic value information; transmitting the random number to the transmission destination terminal after completion of invalidating the electronic value information left in the transmission source terminal in the step of invalidating; decrypting the encrypted electronic value information using the random number; and deleting value information for deleting the invalidated electronic value information left in the transmission source terminal when the transmission destination terminal decrypts the electronic value information.

Thus, electronic value information is reliably transferred from the transmission source terminal to the transmission destination terminal, and illegal replication of the electronic value information and loss of the electronic value information are prevented.

Furthermore, according to an embodiment of the present invention, there is provided an electronic value-information transmission system including a transmission source terminal which includes transmission-destination terminal authentication means for performing mutual authentication with a transmission destination terminal being a transmission destination of the electronic value information using common authentication information; transmission and receiving means for transmitting the electronic value information to the transmission destination terminal when the transmission-destination terminal authentication means authenticates the transmission destination and for receiving reception confirmation for the encrypted electronic value information; invalidation means for temporarily invalidating the electronic value information left in the transmission source terminal after transmission of the electronic value information; value-information deleting means for deleting the invalidated electronic value information and all the information related to the electronic value information when the reception confirmation of the electronic value information is received; and information-validation control means for the transmission destination terminal generating validation information in order to validate the electronic validation information after deleting the electronic value information.

Also, in the electronic value-information transmission system for transferring electronic value information with the transmission destination terminal, the transmission destination terminal includes transmission-source terminal authenticating means for authenticating the transmission source terminal using the authentication information with the transmission source terminal; transmission and receiving means for receiving encrypted electronic value information transmitted from the transmission source terminal and for transmitting reception confirmation for receiving the electronic value information to the transmission source terminal; decrypting value information means for decrypting the encrypted electronic value information using the authentication information; and validating value information means for validating the decrypted electronic validation information based on the validation information.

Thus, electronic value information is reliably transferred from the transmission source terminal to the transmission destination terminal, and illegal replication of the electronic value information and loss of the electronic value information are prevented.

Also, according to an embodiment of the present invention, there is provided an electronic value-information transmission system including a transmission source terminal which includes transmission-destination terminal authentication means for performing mutual authentication with a transmission destination terminal being a transmission destination of the electronic value information using common authentication information; value-information dividing means for dividing the electronic value information into transmission units having no meaning as electronic value information when the transmission-destination terminal authentication means authenticates the transmission destination terminal; transmission and receiving means for transmitting divided electronic value information in the value-information dividing means to the transmission destination terminal and receiving reception confirmation for the divided electronic value information; and value-information deleting for deleting the transmission unit left in the terminal when the transmission source terminal receives the reception confirmation of the electronic value information.

Also, the electronic value-information transmission system including a transmission destination terminal which includes transmission-source terminal authenticating means for authenticating the transmission source terminal using the authentication information with the transmission source terminal; and transmission and receiving means for receiving divided electronic value information transmitted from the transmission source terminal and for transmitting reception confirmation for receipt of the electronic value information to the transmission source terminal.

Also, when the transmission source terminal receives the reception confirmation, a next transmission unit subsequent to the one transmission unit is transmitted, when the transmission destination terminal receives the next transmission unit, a next transmission unit left in the transmission source terminal is deleted, and when the transmission unit of the electronic value information is completely transferred, the electronic value information is reconstructed.

Furthermore, according to an embodiment of the present invention, there is provided an electronic value-information transmission system including a transmission source terminal which includes transmission-destination terminal authentication means for performing mutual authentication with a transmission destination terminal being a transmission destination of the electronic value information using common authentication information; random-number generating means for generating a random number; value-information encrypting means for encrypting the electronic value information using the random number generated by the random-number generating means when the transmission destination terminal is recognized by the transmission-destination terminal authentication means; transmission and receiving means for transmitting encrypted electronic value information by the value-information dividing means to the transmission destination terminal and receiving reception confirmation for the encrypted electronic value information; invalidating means for temporarily invalidating or deleting the electronic value information left in the transmission source terminal when receiving reception confirmation from the transmission destination terminal; random-number transmitting means for transmitting the random number to the transmission destination terminal after completion of invalidating the electronic value information left in the transmission source terminal by the invalidating means; and value-information deleting means for deleting the invalidated electronic value information left in the transmission source terminal when the transmission destination terminal decrypts the electronic value information.

Also, the transmission destination terminal to be a transmission destination of the electronic value information includes transmission-source terminal authenticating means for authenticating the transmission source terminal using the authentication information with the transmission source terminal; transmission and receiving means for receiving encrypted electronic value information transmitted from the transmission source terminal and for transmitting reception confirmation for receiving the electronic value information to the transmission source terminal; and value-information decrypting means for decrypting the encrypted electronic value information using the random number.

Also, the transmission source terminal receives reception confirmation of the encrypted electronic value information from the transmission source terminal, invalidates or deletes the electronic value information, then transmits the random number used for encryption of the electronic value information, and the transmission destination terminal decrypts the electronic value information. Thus, electronic value information is reliably transferred from the transmission source terminal to the transmission destination terminal, and illegal replication of the electronic value information and loss of the electronic value information are prevented.

By an electronic-value information transmission method and electronic-value information transmission system according to the present invention, when an electronic value as electronic-value information is transferred from a sender to a recipient, the electronic-value information of the sender is not simply replicated to the recipient and then is deleted. By combining the identification of the sender and the recipient using mutual authentication and the deletion of the information after confirming that the electronic value information is transferred to the recipient without fail, it is possible to reliably transfer the electronic value information from the sender to the recipient. Thus, the problems in that a plurality of recipients illegally replicate the electronic value information and the electronic value information might be lost by a communication failure are solved.

Additional features and advantages are described herein, and will be apparent from, the following Detailed Description and the figures.

DETAILED DESCRIPTION

Figure 1:
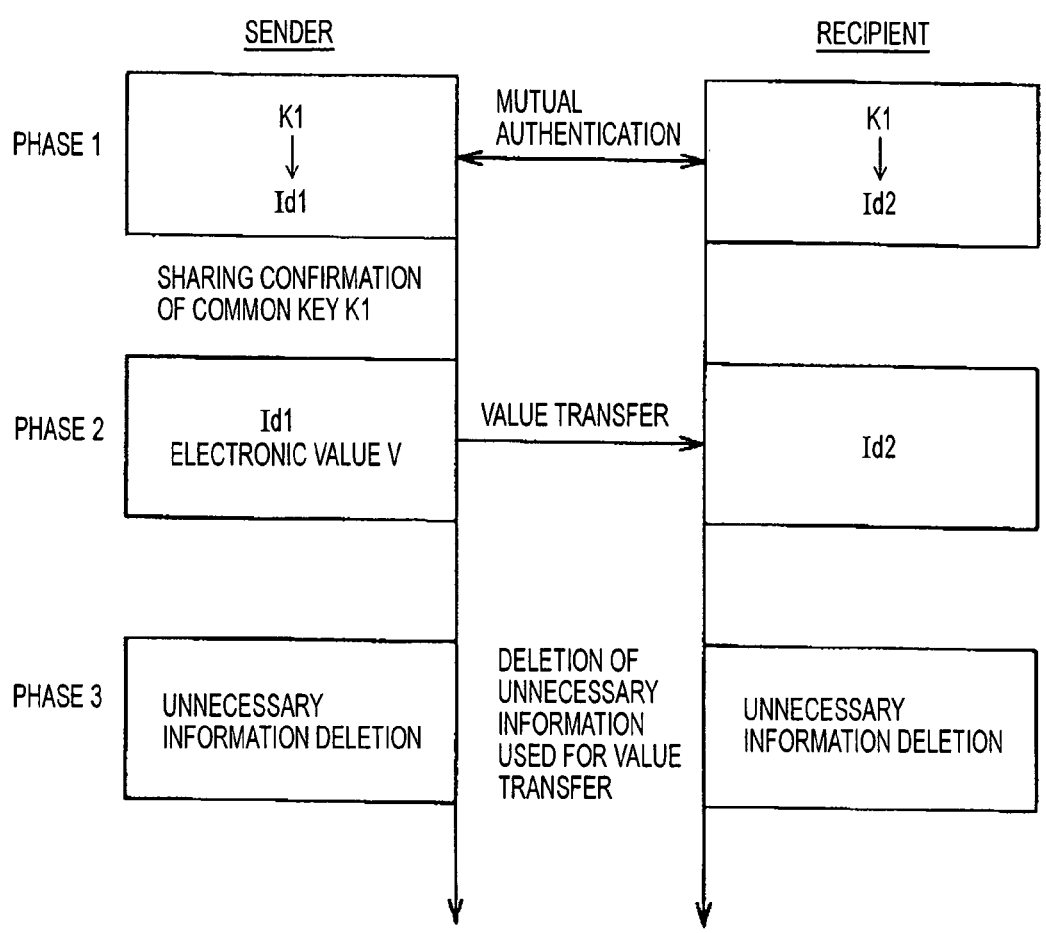
FIG. 1 is a timing chart illustrating a method for transmitting an electronic value according to an embodiment of the present invention.

In an electronic-value information transmission method according to the present invention, when an electronic value is transferred between electronic systems provided with an IC card capable of recording an electronic value information (in the following, referred to as an electronic value), such as electronic money, an electronic ticket, etc., or an IC chip capable of recording an electronic value, the replication and the deletion of the electronic value of the sender are not simply performed. In this method, a sender and a recipient are identified by mutual authentication and the electronic value is deleted after it is confirmed that the electronic value has been transferred to the recipient without fail. Thus, the problems in that the electronic value information is illegally copied, the electronic value information is lost by a communication failure, etc., are solved.

In the following, a detailed description will be given of a method of transmitting electronic value information, which is shown as an embodiment of the present invention.

This method of transmitting an electronic value is a method of transmitting an electronic value when an electronic value is transmitted and received between electronic systems including an IC chip capable of recording an electronic value. Electronic systems to which a method of transmitting an electronic value can be applied as an embodiment of the present invention include a portable information processing terminal such as a mobile phone, a PDA (Personal Digital Assistant), etc. This electronic value transmission may be transmission between a terminal of an electronic-value service provider providing various electronic values and a user's terminal, or may be transmission between electronic-value recordable electronic systems possessed by a user. Also, a recipient of an electronic value may be a so-called IC card provided with an IC chip capable of recording an electronic value. A description will be given of a specific example of an electronic-value transmission system to which the method of transmitting an electronic value is applied below.

In an electronic-value transmission method shown as a specific example of the present invention, a terminal (in the following, referred to as a sender) to be a transmission source of an electronic value and a terminal (in the following, referred to as a recipient) have the following characteristics. The characteristics for a sender are: (1) An electronic value sent from the sender is not allowed to be used except by a specific recipient. (2) When an electronic value sent becomes possible to be used by a recipient, the sender becomes unallowed to use the electronic value. (3) After the electronic value is transferred, the electronic value generated by the transmission processing of the electronic value is invalidated. This is because it is desirable that no information related to the electronic value remains in the sender.

Also, the characteristics for a recipient are: (4) It is guaranteed that a legitimate sender sends a legitimate electronic value. (5) If receiving processing of an electronic value is disrupted by a communication failure, etc., processing for receiving the electronic value is performed again. (6) After an electronic value is received, no information related to the electronic value generated by the transmission processing of the electronic value is left in the sender.

A description will be given of the processing flow of the electronic-value transmission method, which is shown as a specific example of the present invention using FIG. 1. The transfer of an electronic value from a sender to a recipient, shown by this specific example, is performed in the following procedure. First, mutual authentication processing is performed between a sender who is a transmission source of an electronic value and a recipient who is a transmission destination. In this specific example, this mutual authentication processing is called phase 1. If the sender and the recipient are recognized with each other in the authentication processing in phase 1, the electronic value is actually transferred. When an electronic value is transferred, first, a secure transmission/receiving path which can keep secret against interception, hindrance, unauthorized use, etc., is formed between a sender and a recipient, and then the electronic value is transferred. This processing is called phase 2. When the transfer of the electronic value is completed by the phase 2, the recipient deletes unnecessary information related to the electronic value, and a notification that deletion has been completed is sent to the sender. The sender deletes the electronic value before the transfer and all the information related to the transfer processing of this electronic value by this notification. In this specific example, the processing for deleting all the unnecessary information by the sender and the recipient after transferring the electronic value is called phase 3.

In the following, a description will be given of the achieving method of each phase.

In the mutual authentication processing of phase 1, unique information (Id1, Id2) of the devices or data necessary for communication is mutually encrypted by a common key K1 as common authentication information between the sender and the recipient.

Figure 2:
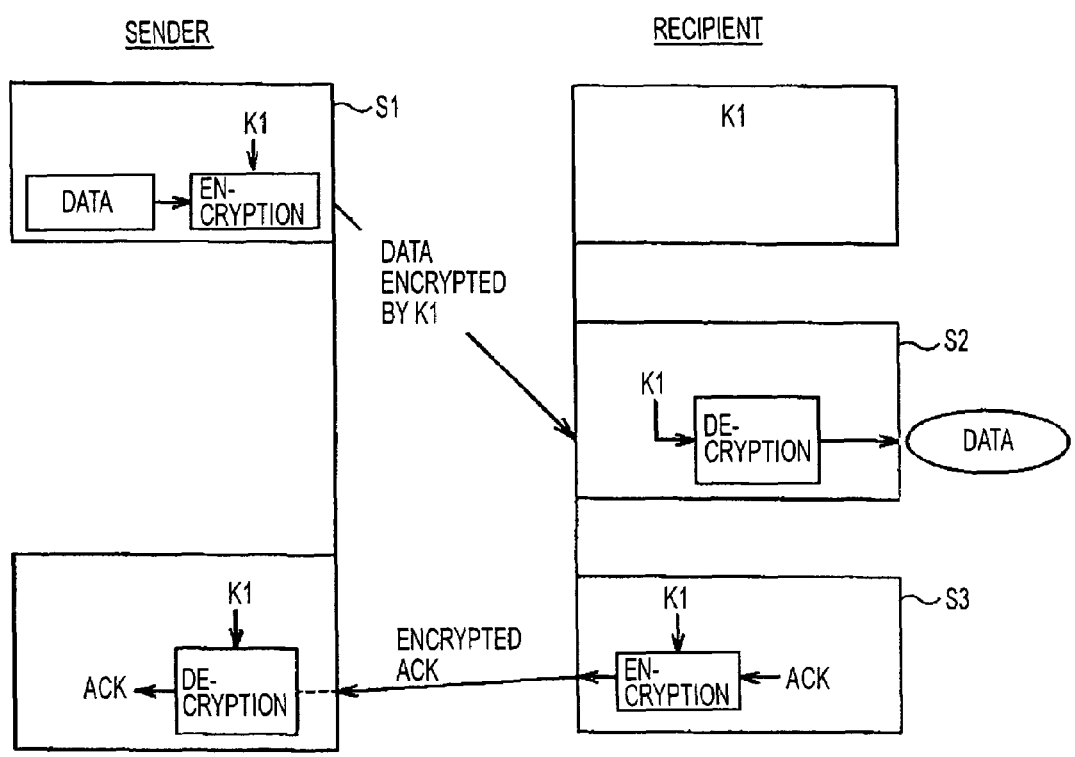
FIG. 2 is a diagram illustrating an example of a first phase in a method for transmitting an electronic value according to an embodiment of the present invention.

The sender and the recipient individually possess a predetermined common key K1 as authentication information. As shown in FIG. 2, the sender and the recipient confirm whether mutual communication is possible with the other party by the determination of the possession of the common key K1. If the common key K1 is confirmed, all the data is encrypted by the common key K1 for the following communication. Alternatively, the data is decrypted by the common key K1.

Figure 3:
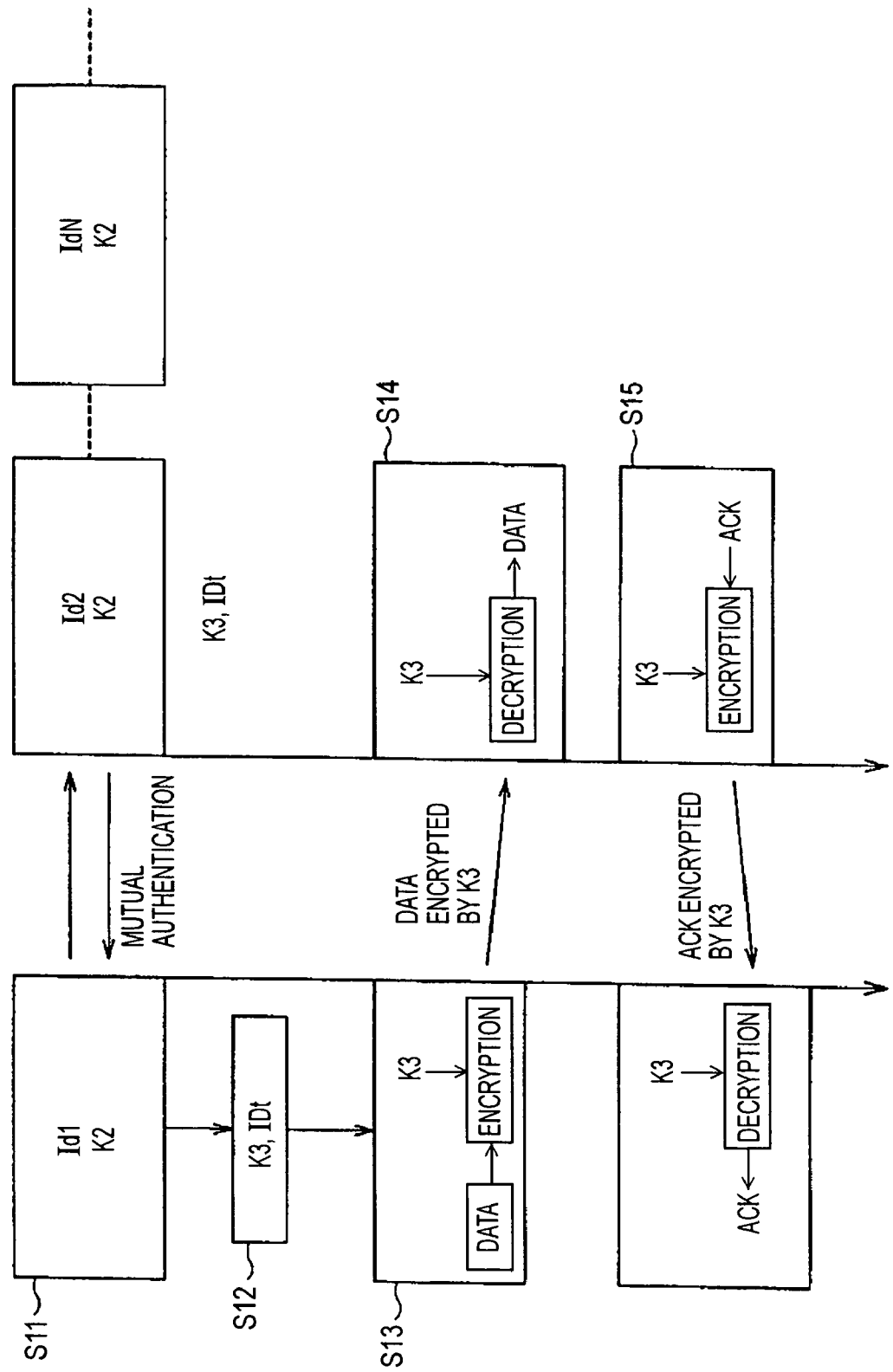
FIG. 3 is a diagram illustrating another example of a first phase in a method for transmitting an electronic value according to an embodiment of the present invention.

Also, as another example of mutual authentication in phase 1, the sender and the recipient mutually authenticate each other using a public key as a predetermined authentication information and unique information to the devices provided for each of the sender and recipient, and then for example, the sender generates a session key. For the subsequent communication between the sender and the recipient, the generated session key is used as mutual common information. That is to say, as shown in FIG. 3, for example, a sender having Id1, a recipient having Id2, and a recipient having Idn share a public key K2 for mutual authentication. At this time, each terminal can perform mutual authentication using individual IDs and the public key K2. The terminals of the sender and the recipient recognized to be allowed to mutually communicate by the authentication proceed to phase 2.

Subsequently, a description will be given of a specific example of the processing of phase 2 in which a transmission/receiving path keeping secret is formed between the mutually authenticated sender and recipient to transfer an electronic value using FIGS. 2 to 4. In phase 2, before the sender transfers an electronic value to the recipient, first, a secure transmission/receiving path is formed between the sender and the recipient.

FIG. 2 shows the case in which a sender and a recipient share a predetermined common key K1 as authentication information. The sender and the recipient checks whether it is possible to mutually communicate with the other party by checking whether the other party possesses a common key K1. If the other party has been confirmed to possess the common key K1, the sender encrypts all the data to be used for the subsequent communication using the common key K1. Alternatively, the recipient decrypts the data using the common key K1.

In step S1, a sender encrypts data using the common key K1 and sends it to a recipient. In step S2, the recipient decrypts the received data using the common key K1 possessed by the recipient, and recognizes the sender when successfully decrypted. In step S3, the recipient encrypts confirmation (ACK) indicating successful authentication using the common key K1, and sends it to the sender. In step S4, the sender confirms the ACK from the recipient when the sender successfully has decrypted the received data using the common key K1. In this manner, secure communication between the sender and the recipient is established.

Next, a description will be given of the case in which a sender and a recipient mutually authenticate using mutual IDs and a public key K2 and communicate with each other.

The terminals of the sender and the recipient recognized to be allowed to mutually communicate by the authentication proceed to the phase 2 shown in FIG. 3.

In step S11, the sender confirms that the public key K2 is mutually possessed as authentication information. If the mutual authentication is successful, in step S12, the sender issues a session key K3 and IDt to the recipient as common information shared for the subsequent communication. The session key K3 and IDt are information shared by the sender and the recipient, but can have a different value for each communication.

In the next step S13, the sender encrypts data by the session key K3, and sends it to the recipient. In step S14, the recipient decrypts the encrypted data sent from the sender by the session key K3. In step S15, the recipient encrypts acknowledgement (ACK) indicating successful communication by the session key K3, and sends it to the sender. When the sender receives the data encrypted by the session key K3, in step S16, the sender decrypts the data by the session key K3, and confirms the ACK from the recipient. Thus, phase 2 is completed.

A description will be given of an example, in which the sender transfers an electronic value to the recipient in phase 2, as follows.

When the sender and the recipient are recognized with each other by the mutual authentication processing in phase 1 described above, the sender proceeds to phase 2 and actually transfers the electronic value.

In step S21, the sender encrypts an electronic value V using a common key Kt shared with each other, and transmits an electronic value V' obtained by encryption to the recipient. In step S22, the recipient receives the electronic value V'. When the recipient completes the receiving, the recipient encrypts acknowledgment (ACK) indicating the receiving completion using the common key Kt, and transmits it to the sender in step S23.

The recipient decrypts the received electronic value V' using the common key Kt. At this time, there is also the electronic value V' at the sender, and thus in this specific example, the decrypted electronic value V is not allowed to be used directly. That is to say, it is necessary for the recipient to be allowed to validate the electronic value V.

In step S24, the sender receives the ACK encrypted by the recipient using the common key Kt, and decrypts the ACK by the common key Kt. If the encrypted data is the receiving confirmation of the electronic value from the recipient, the sender deletes all of the electronic value V left in the sender, the encrypted electronic value V', information related to the transmission of the electronic value, etc.

Also, in step S25, the sender transmits validation information for validating the electronic value sent to the recipient after the deletion processing. At this time, the sender may encrypt the validation information by the common key Kt. In step S26, the recipient goes into a state in which the electronic value can be used only after receiving the validation information from the sender.

In this manner, even if the electronic value temporarily exists both in the sender and the recipient, it is possible to avoid a risk of illegal replication, alteration, etc., of the electronic value by not allowing the recipient to use unless the electronic value of the sender is deleted.

Figure 4:
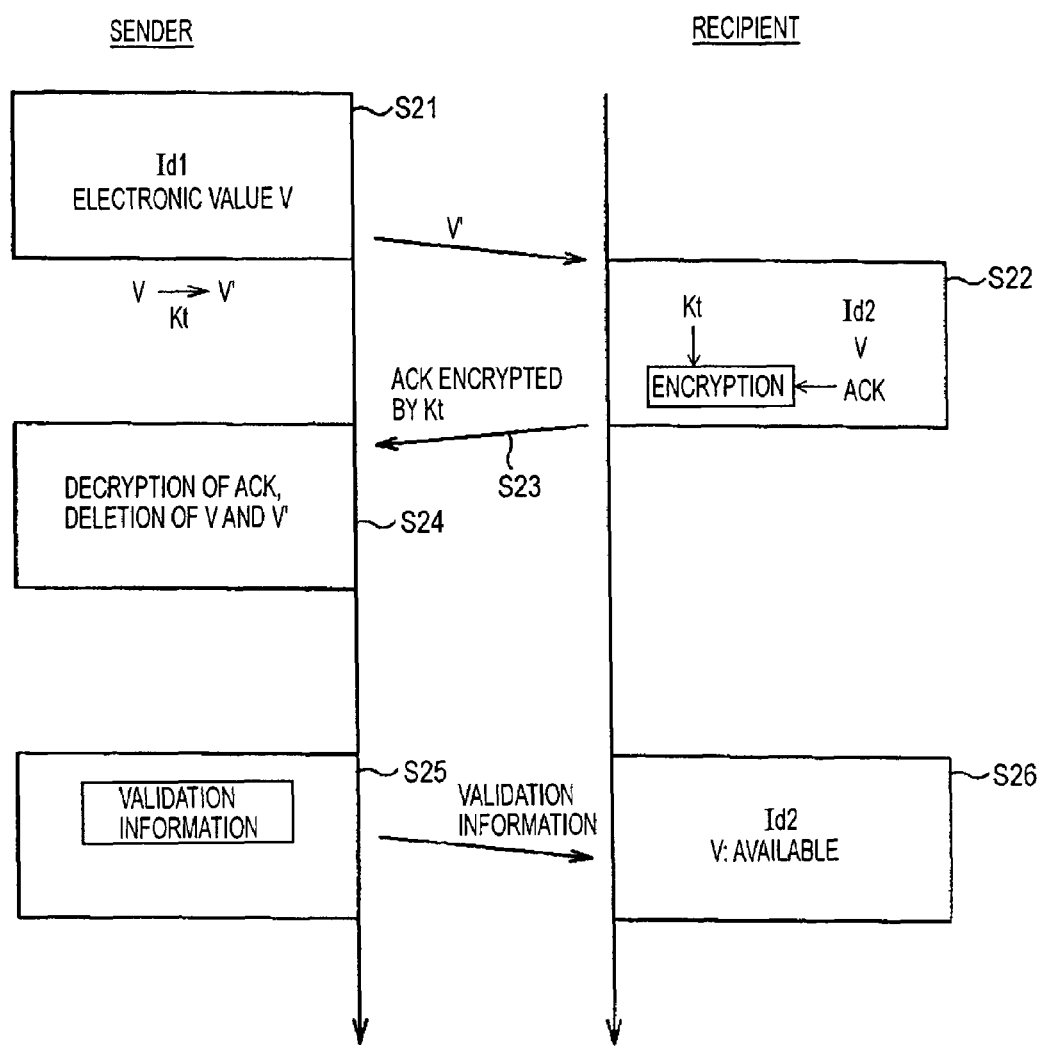
FIG. 4 is a diagram illustrating a specific example of a second phase and a third phase in a method for transmitting an electronic value according to an embodiment of the present invention.

In the processing shown in FIG. 4, if the authentication processing shown in FIG. 2 is performed as phase 2, the common key K1 can be used for the common key Kt, and if the authentication processing shown in FIG. 3 is performed as phase 2, the session key K3 can be used for the common key Kt.

Also, in the transfer processing described above, if the recipient fails to receive data such as the electronic value in step S22, etc., after an elapse of a predetermined time period, the processing for repeating a phase having uncompleted communication is performed. For example, during the communication between the sender and the recipient in each phase, each terminal adds a counter indicating which phase processing is executed and the device ID of the other party of the communication. Also, the sender and the recipient transmits and receives a completion notification corresponding to a counter indicating a phase. Thus, is either one of the terminals fails to receive a completion notification in phase 1, phase 2, or phase 3, the terminal determines that the communication is disrupted, and repeats the phase represented by a counter with which a completion notification fails to be received.

Next, a description will be given of another embodiment of the transfer processing and the deletion processing of the electronic value in phase 2 using FIG. 5. The transfer processing and the deletion processing of the electronic value, which is described using FIG. 5, has a characteristic in which a sender divides an electronic value and transmits each transmission unit generated by the division to a recipient.

Figure 5:
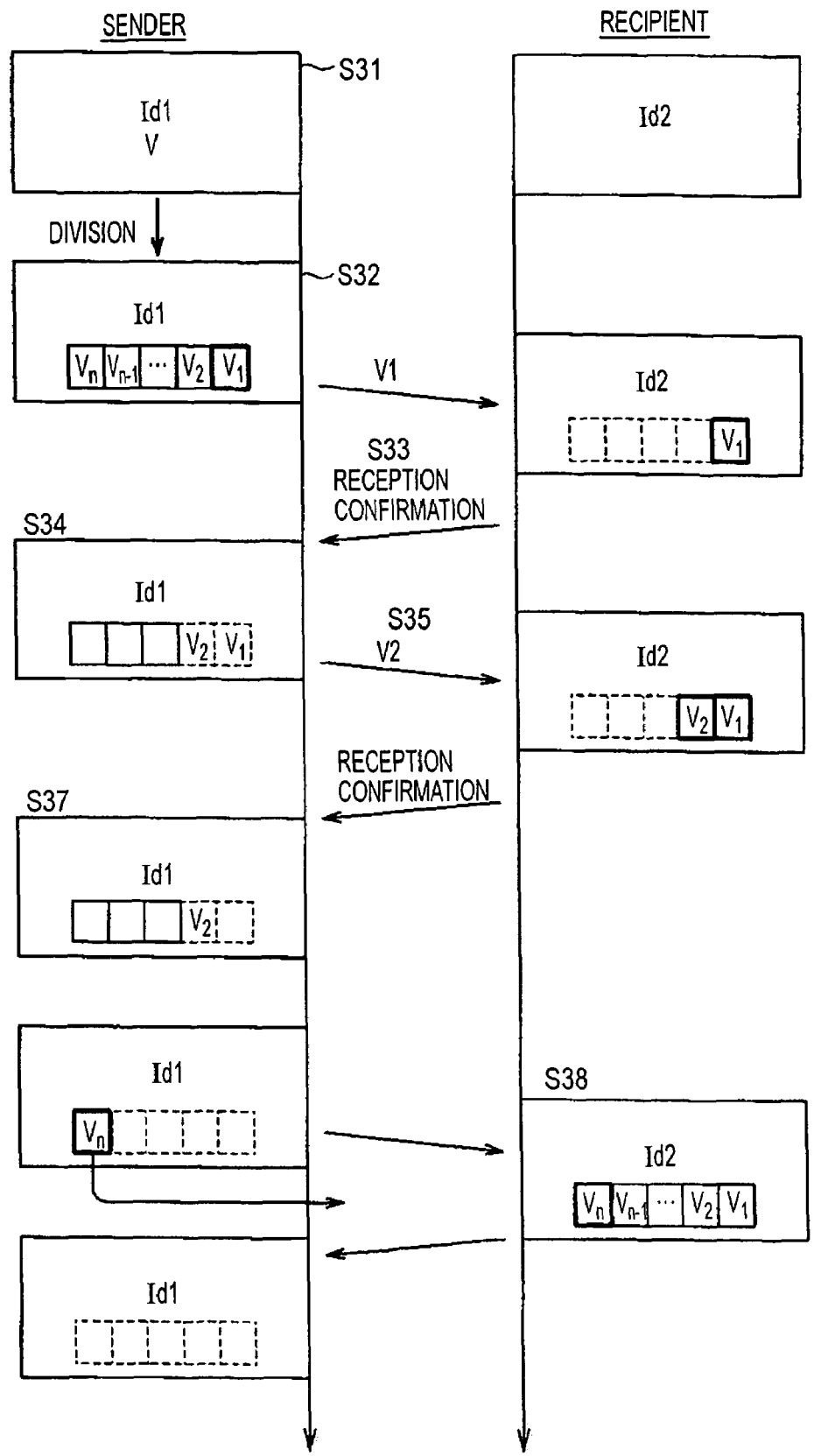
FIG. 5 is a diagram illustrating a specific example of a second phase and a third phase in a method for transmitting an electronic value according to an embodiment of the present invention.

In the embodiment shown in FIG. 5, first, in step S31, the sender divides the electronic value into transmission units v1, v2, . . . , vn having no meaning as an electronic value after the authentication processing shown in FIG. 2 or the authentication processing shown in FIG. 3 is performed in phase 2. In step S32, the sender transmits a transmission unit v1 to the recipient. When the recipient receives v1, the recipient returns reception confirmation for v1 as step S33.

When the sender receives reception confirmation from the recipient, the sender deletes the transmission unit v1 in step S34. Subsequently, the sender sends a transmission unit v2 in step S35. When the recipient receives v2, the recipient returns reception confirmation for v2 in step S36. When the sender receives reception confirmation for v2, the sender deletes the transmission unit v2 in step S37.

In this manner, in the embodiment shown in FIG. 5, when the sender receives reception confirmation for a transmission unit of the electronic value, the sender transmits the next transmission unit to that transmission unit and repeats the deletion process of the transmitted transmission units. In step S38, when all the transmission units of the divided electronic value is completely transferred, the recipient reconstruct the electronic value. The reconstructed electronic value can be used by the recipient. Also, the sender invalidates all the transmission units possessed b the sender by the reception confirmation from the recipient when the electronic value is reconstructed. Accordingly, there exists the electronic value only at the recipient.

In the steps subsequent to the step S32 described above, for example, if the recipient fails to receive a transmission unit after an elapse of a predetermined time period, the sender performs retransmission of the transmission unit of which reception confirmation has not been received. Thus, for example, the number of vn, etc., is transmitted in advance. During the communication between the sender and the recipient when each transmission unit is transmitted, a counter indicating which transmission unit is in the process of transfer and the device ID of the other party of the communication are added. Also, the recipient transmits reception confirmation corresponding to the counter indicating the transmission unit. If the reception confirmation is not obtained after an elapse of a predetermined time period from the transmission of a transmission unit, the transmission of the transmission unit indicated by the counter whose reception confirmation has failed to be received is repeated.

Also, in the transmission step, exemplified by step S32, for transmitting a transmission unit to the recipient, or in the step for returning reception confirmation in step S33, a transmission unit and reception confirmation may be encrypted using the common key K1 or the session key K3, which was used in the authentication processing shown in FIG. 2 or the authentication processing shown in FIG. 3 in phase 1, and transmitted or received.

In this manner, in the embodiment shown in FIG. 5, an electronic value does not exist both in the sender and the recipient at the same time by dividing the electronic value for transmission. Thus, it is possible to avoid a risk of illegal replication of an electronic value, alteration, etc. Also, it is possible to prevent mistaken loss of the electronic value, etc., at the time of communication.

Next, a description will be given of still another embodiment of the transfer processing and the deletion processing of the electronic value in phase 2 using FIG. 6. The transfer processing and the deletion processing of the electronic value, which is described using FIG. 6, has a characteristic in which a sender generates a random number, encrypts an electronic value by this random number, and sends the random number necessary for decryption to the recipient at different timing from the transmission timing of the electronic value.

Figure 6:
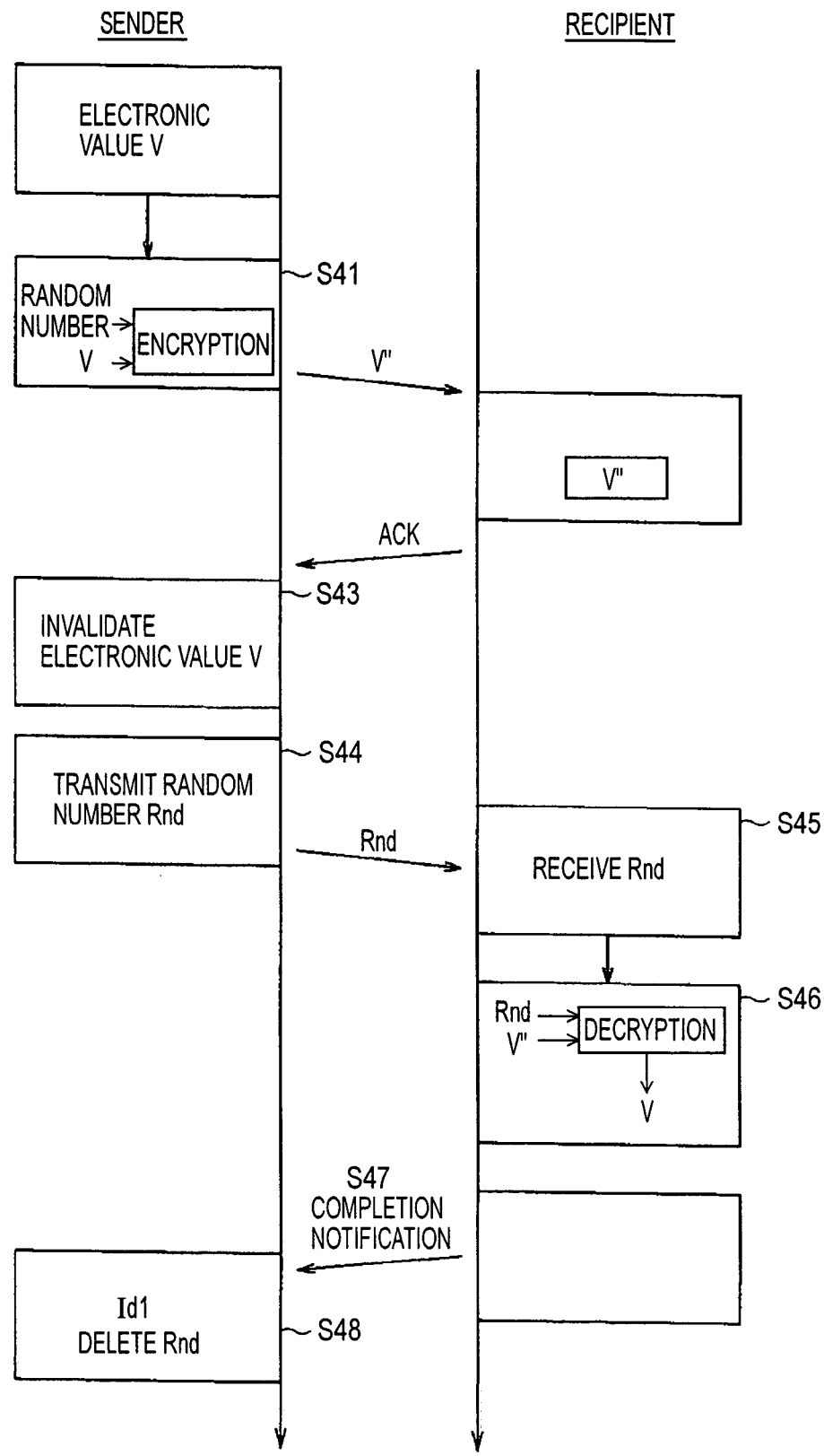
FIG. 6 is a diagram illustrating a specific example of a second phase and a third phase in a method for transmitting an electronic value according to an embodiment of the present invention.

In the embodiment shown in FIG. 6, the authentication processing shown in FIG. 2 in phase 1 or the authentication processing shown in FIG. 3 is performed, and then the sender generates a random number Rnd in step S41. The sender generates V''' to be sent by encrypting the electronic value V by this random number Rnd, and sends it to the recipient. In step S42, when the recipient receives the electronic value V''' encrypted by the random number Rnd, the recipient returns reception confirmation (ACK) to the sender.

The sender needs to invalidate the electronic value V without fail before sending the random number. Thus, when the sender receives the ACK, the sender invalidates or deletes the electronic value V in step S43. After the sender invalidates or deletes the electronic value V, the sender transmits the random number Rnd used for the encryption to the recipient in step S44.

When the recipient receives the random number Rnd in step S45, the recipient decrypts the encrypted electronic value V''' received before using the random number Rnd to obtain the electronic value V in the subsequent step S46.

When the recipient obtains the electronic value V, the recipient transmits a completion notification to the sender in step S47. When the sender receives the completion notification, the sender deletes the random number Rnd in step S48.

In this manner, in the embodiment shown in FIG. 6, an electronic value is encrypted by a generated random number, and the random number necessary for decryption is sent to the recipient at different timing from the transmission timing of the electronic value. Accordingly, an electronic value in an available state does not exist both in the sender and the recipient at the same time, and thus it is possible to avoid a risk of illegal replication of an electronic value, alteration, etc.

In the following, a detailed description will be given of an electronic-value transmission system 1 to which the electronic-value transmission method shown as a specific example of the present invention is applied using FIGS. 7 to 9.

Figure 7:
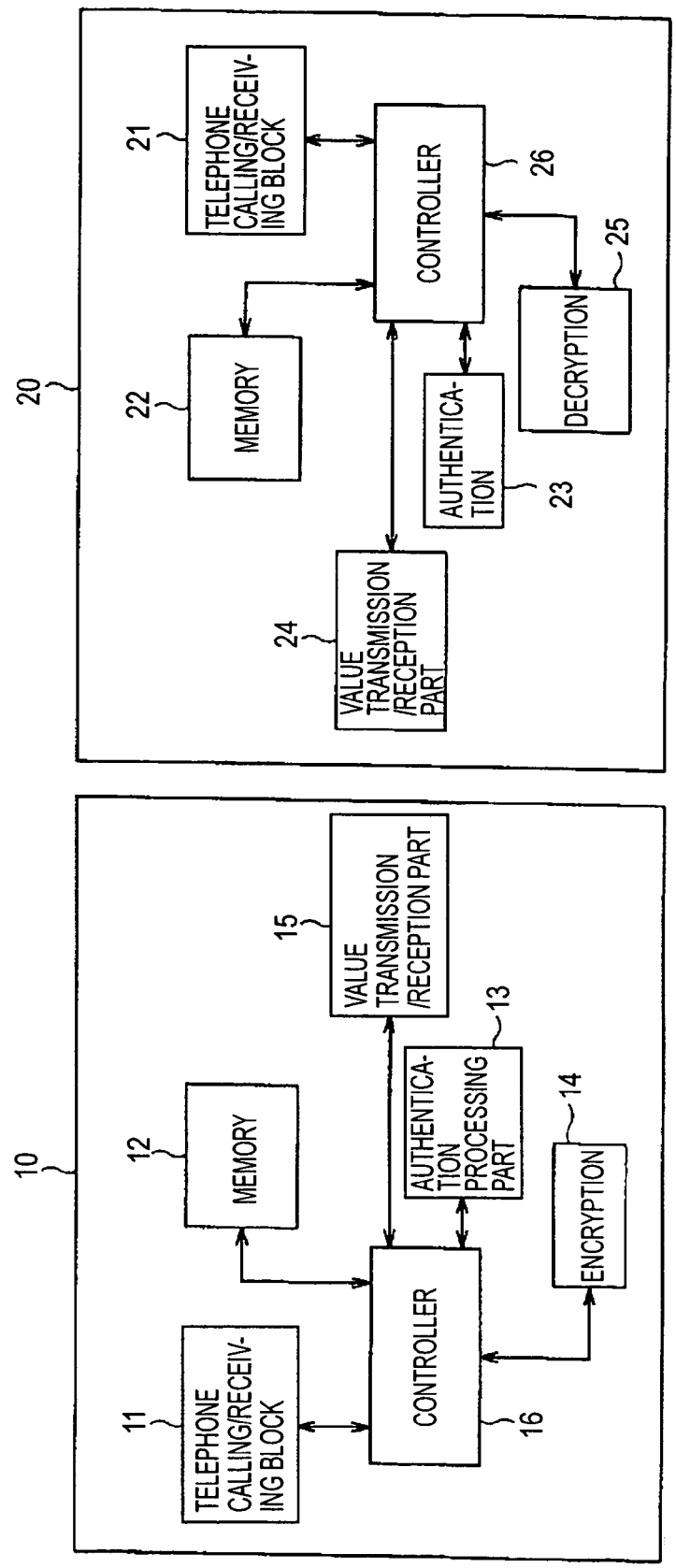
FIG. 7 is a block diagram illustrating an electronic value transmission system to which a method for transmitting an electronic value of the present invention is applied.
Figure 8:
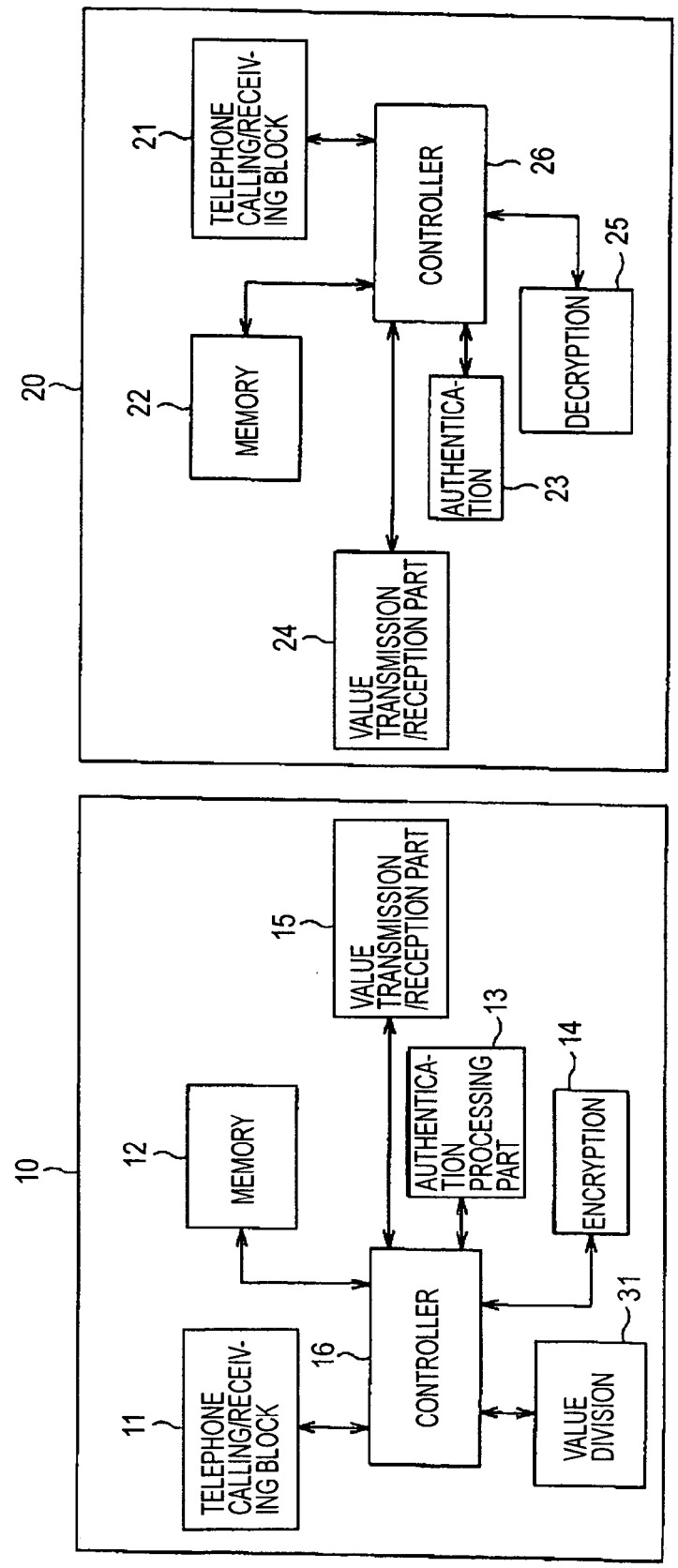
FIG. 8 is a block diagram illustrating an electronic value transmission system to which a method for transmitting an electronic value of the present invention is applied.
Figure 9:
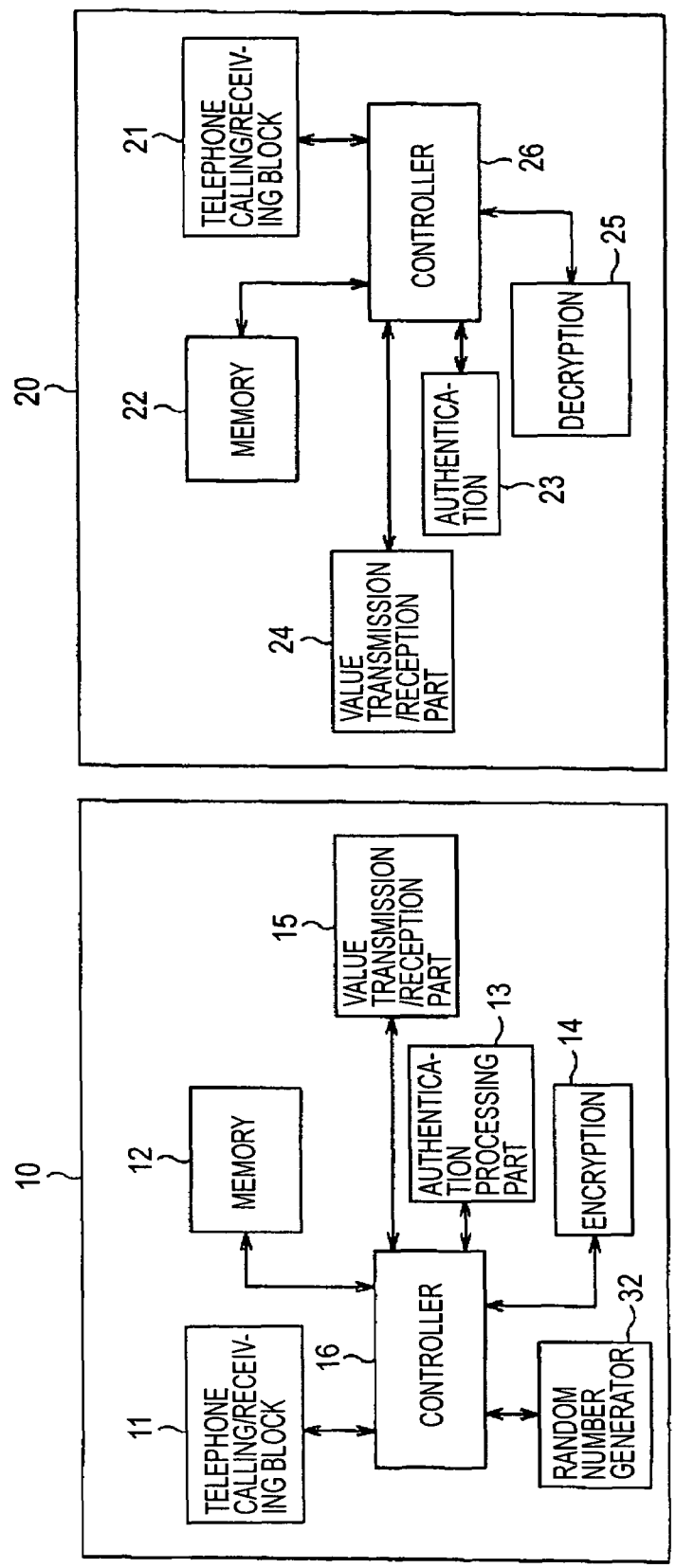
FIG. 9 is a block diagram illustrating an electronic value transmission system to which a method for transmitting an electronic value of the present invention is applied and FIG. 10 is a configuration diagram illustrating a value transmission/receiving part according to an embodiment of the present invention.

An electronic-value transmission system shown in FIGS. 7 to 9 are systems which allows to transfer an electronic value between an electronic system provided with an IC card capable of recording an electronic value, such as electronic money, an electronic ticket, etc., or an IC chip capable of recording an electronic value, and an electronic system provided with a reader/writer capable of reading/writing from/into this IC chip. Here, a description will be given by assuming that at least one of the electronic systems is provided with a reader/writer and the other of the systems is provided with an IC chip. However, both of the systems may be provided with a reader/writer and an IC chip in reality.

The electronic-value transmission system 1 shown in FIG. 7 is a system which can achieve the electronic-value transmission method shown in FIGS. 1 to 4 described above. In this specific example, the system includes a mobile phone 10 including at least a reader/writer and a mobile phone 20 including an IC chip capable of storing an electronic value.

The mobile phone 10 in the electronic-value transmission system 1 includes a telephone calling/receiving block 11, for basic operations and functions as a mobile phone, including a voice output part, a voice input part, a voice processing part, a transmission/receiving circuit, an operation input part, etc., a memory 12 for storing information such as an electronic value, etc., an authentication processing part 13 as transmission-destination-terminal authentication means for authenticating each other with the mobile telephone 20, which is the transmission destination of the electronic value using a common key K1, which is common authentication information, an encryption part 14 as value-information encryption means for encrypting the electronic value using the common key K1 when the authentication processing part 13 has authenticated the transmission destination, a value-transmission/reception part 15 as transmission/reception means for transmitting the electronic value encrypted in the encryption part 14 to the mobile telephone 20, which is the recipient and for receiving reception confirmation for the electronic value encrypted, and a controller 16 for deleting all the information related to the electronic value before the transfer and this electronic value and totally controlling each component described above. Although not shown in the figure, the controller 16 includes a CPU, a ROM for storing software, etc., in order for the CPU to perform electronic-value transmission processing, and a RAM for a working area of the CPU, etc.

The controller 16 performs the electronic-value transmission processing of phase 1, phase 2, and phase 3. In phase 1, the authentication processing part 13 performs authentication processing of the recipient. Also, the authentication processing part 13 authenticates a predetermined public key K1 and the recipient terminal to be the transmission destination, then a session key is generated, and the generated session key may be used as authentication information (the example in FIG. 3). When the sender and the recipient has authenticated with each other in the authentication processing in phase 1, the controller 16 performs the transfer processing (phase 2) of the electronic value shown in FIG. 4.

Also, the mobile phone 20 includes a telephone calling/receiving block 21, for basic operations and functions as a mobile phone, including a voice output part, a voice input part, a voice processing part, a transmission/receiving circuit, etc., a memory 22 for storing information such as an electronic value, etc., an authentication processing part 23 as transmission-source-terminal authentication means for authenticating each other with the mobile telephone 10, which is the transmission source of the electronic value using a common key K1, which is common authentication information, a value transmission/reception part 24 as value transmission/reception means for receiving the electronic value encrypted in the encryption part 14 from the mobile phone 10, which is the recipient, and for transmitting the reception confirmation of the receiving of the encrypted electronic value to the mobile phone 10, a decryption part 25 for decrypting the encrypted electronic value using the common key K1, and a controller 26 for totally controlling each component described above.

Accordingly, in the electronic-value transmission system 1 shown in FIG. 7, the mobile phone 10 corresponds to the sender described in FIGS. 1 and 2 described above, and the mobile phone 20 corresponds to the recipient.

Subsequently, the electronic-value transmission system 2 shown in FIG. 8 is a system which can achieve the electronic-value transmission method shown in FIG. 5 described above. Similarly to FIG. 7, in this specific example, the system includes a mobile phone 10 including at least a reader/writer and a mobile phone 20 including an IC chip capable of storing an electronic value. The electronic-value transmission system 2 has a characteristic in which the mobile phone 10, which is a sender, includes a value division part 31 as value-information division means for dividing the electronic value into transmission units having no meaning as an electronic value and transmitting each transmission unit generated to the recipient. In the electronic-value transmission system 2, the controller 16 totally controls each component described above to perform the authentication processing shown in FIG. 2 or the authentication processing shown in FIG. 3 in phase 1, and then performs the transfer processing of the electronic value as shown in FIG. 5.

Also, the electronic-value transmission system 3 shown in FIG. 9 is a system which can achieve the electronic-value transmission method shown in FIG. 6 described above. Similarly to FIG. 7, in this specific example, the system includes a mobile phone 10 including at least a reader/writer and a mobile phone 20 including an IC chip capable of storing an electronic value. The electronic-value transmission system 3 has a characteristic in which the mobile phone 10, which is a sender, includes a random-number generator 32 for generating a random number, encrypting the electronic value by the generated random number, and transmitting the random number necessary for decryption to the recipient at different timing from the transmission timing of the electronic value. In the electronic-value transmission system 3, the controller 16 totally controls each component described above to perform the authentication processing shown in FIG. 2 or the authentication processing shown in FIG. 3 in phase 1, and then performs the transfer processing of the electronic value as shown in FIG. 6.

In an electronic-value transmission system shown in FIGS. 7 to 9 as a specific example of the present invention, the mobile phones 10 and 20 employ a so-called RFID (Radio Frequency IDentification) system using a noncontact IC card, a radio tag, etc. The mobile phones 10 and 20 contain a memory part corresponding to a memory part of an IC card and a radio tag, and a communication circuit for noncontact nearby communication. Also, the mobile phones 10 and 20 contain a planar coil antenna (in the following, sometimes described as a loop-coil antenna) for noncontact communication, which performs at least data transmission with a reader/writer apparatus in a noncontact manner by electromagnetic inductive coupling.

In the following, a detailed description will be given of value transmission/reception parts 15 and 24 in an embodiment of the present invention with reference to FIG. 10. Here, a description will be given of the case in which the value transmission/reception part 15 is assumed to be an IC chip having an antenna for noncontact communication and the value transmission/reception part 24 functions as a reader/writer for reading/writing data from/into this IC chip in a noncontact manner. However, the mobile phones 10 and 20 may include both functions with each other.

Figure 10:
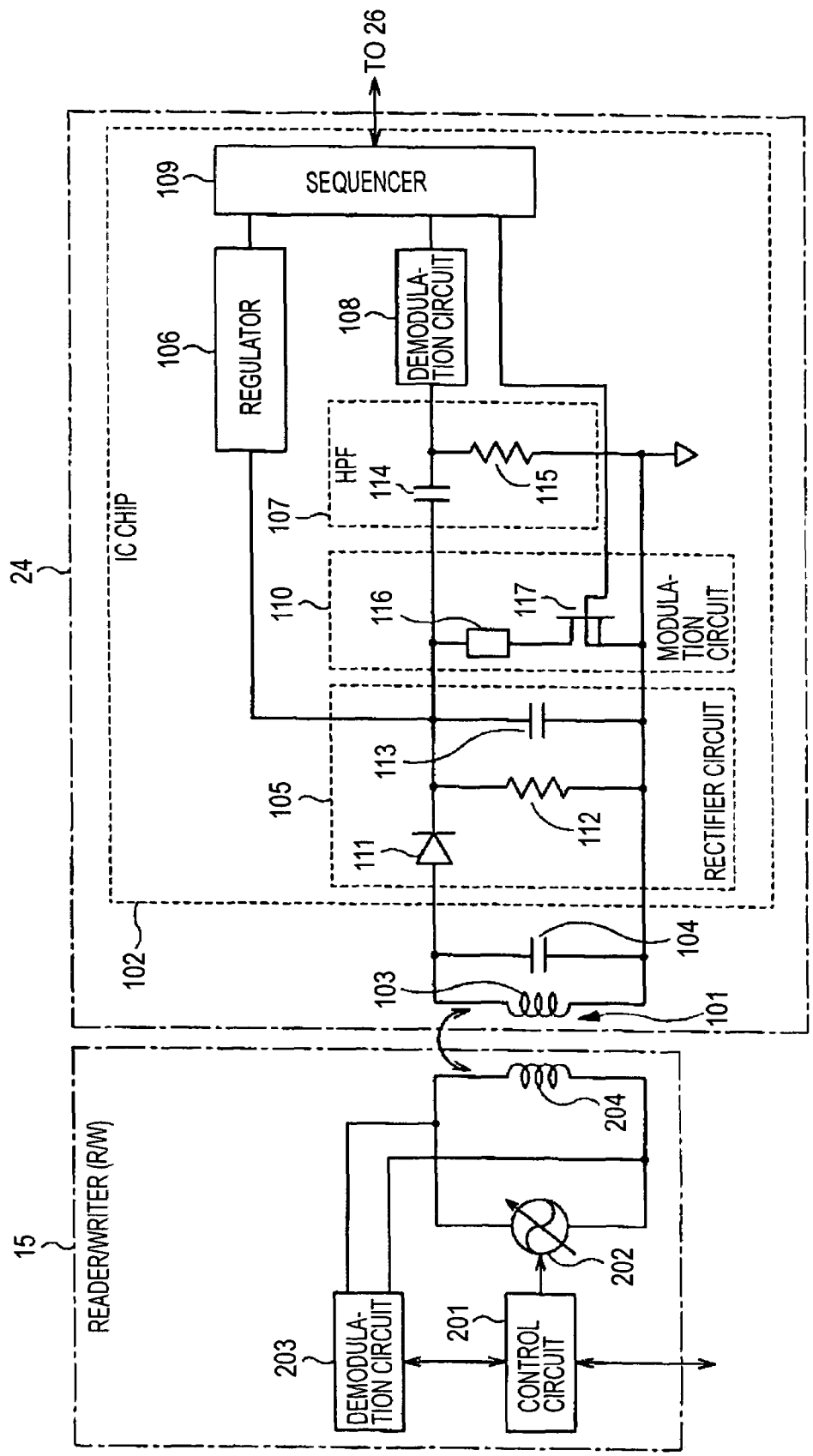

The value transmission/reception part 24 shown in FIG. 10 contains a loop-coil antenna with a conducting wire wound in a planar state in parallel to the use surface. The value transmission/reception part 24 contains a communication circuit similar to an IC card without a power source such as a battery, which conforms to, for example, ISO7810.

The value transmission/reception part 24 includes, on a printed-circuit board, a loop-coil antenna 101 for transmitting and receiving data by the coupling with an external electromagnetic field and an IC (Integrated Circuit) 102 on which electronic circuits for performing various processing in order to write and read data are integrated.

As an example of the loop-coil antenna 101, a resonant antenna circuit in which a loop-coil 103 as a loop-coil antenna including a conducting wire wound in a planar state and a capacitor 104 are connected in parallel, etc. can be applied. The loop-coil antenna 101 is electromagnetic inductive coupled with a electromagnetic field emitted from a reader/writer antenna circuit 204 of the value-transmission/reception part 15 as a reader/writer described below, converts the coupled electromagnetic field into an electrical signal, and supplied it to the IC 102.

The IC 102 includes a rectifier circuit 105 as rectifying means for rectifying and smoothing an electrical signal provided in the loop-coil antenna 101 induced by the electromagnetic field caused by the antenna of the value transmission/reception part 15. Also, the IC 102 has a regulator 106 for converting an electrical signal provided from the rectifier circuit 105, a HPF (High-Pass Filter) 107 for extracting high frequency components of the electrical signal provided from the rectifier circuit 105, a demodulation circuit 108 for demodulating a signal of high frequency components input from the HPF 107, a sequencer 109 for controlling writing and reading of data corresponding to the data supplied from the demodulation circuit 108, and a modulation circuit 110 for modulating data to be transmitted by the loop-coil 103. The data supplied from the demodulation circuit 108 is controlled by the controller 26 to be stored in the memory 22.

The rectifier circuit 105 includes a diode 111, a resistor 112, and a capacitor 113. The anode terminal of the diode 111 is connected to one end of the loop-coil 103 and the capacitor 104, and the cathode of the diode 111 is connected to one end of the resistor 112 and the capacitor 113. The other end of the resistor 112 and the capacitor 113 is connected to the other end of the loop-coil 103 and the capacitor 104. The rectifier circuit 105 outputs the electrical signal produced by rectifying and smoothing the electrical signal supplied from the loop-coil 103 to the regulator 106 and the HPF 107.

The regulator 106 is connected to the cathode terminal of the diode 111 of the rectifier circuit 105 described above, and one end of the resistor 112 and the capacitor 113. The regulator 106 restrains a voltage variation (data component) of the electrical signal supplied from the rectifier circuit 105 to stabilize the signal, and then supplies the signal to the sequencer 109 as a direct electrical power. Thus, the voltage variation, which becomes the cause of the malfunction of the sequencer 109, etc., for example, the voltage variation caused by the movement of the position of he mobile phone 20, and the voltage variation caused by a change in the power consumption within the mobile phone 20 are restrained.

The HPF 107 includes a capacitor 114 and a resistor 115. The HPF 107 extracts high frequency component of the electrical signal supplied from the rectifier circuit 105, and outputs the signal to the demodulation circuit 108.

The demodulation circuit 108 is connected to the other end of the capacitor 114 and the resistor 115 of the HPF 107. The demodulation circuit 108 demodulates the signal of the high frequency component input from the HPF 107, and outputs the signal to the sequencer 109.

The sequencer 109 has a ROM (Read Only Memory) and a RAM (Random Access Memory) inside, and is connected to the demodulation circuit 108 described above. The sequencer 109 stores a signal (command) input from the demodulation circuit 108 into the RAM, and analyzes this in accordance with the program stored in the ROM. The sequencer 109 reads data stored in the memory 22 as necessary based on the analysis result. Alternatively, the sequencer 109 writes the data supplied from the demodulation circuit 108 into the memory 22. Also, the sequencer 109 generates a response signal corresponding to the command to supply the signal to the modulation circuit 110.

For the memory 22, a nonvolatile memory such as an EEPROM (Electrically Erasable Programmable Read Only Memory), etc., which does not need power to maintain data, can be used, and is connected to the sequencer 109 described above. The memory 22 stores the data supplied from the demodulation circuit 108 based on the analysis result of the sequencer 109.

The modulation circuit 110 includes a series circuit of an impedance 116 and an FET (Field Effect Transistor) 117. One end of the impedance 116 is connected to the cathode terminal of the diode 111 of the above-described rectifier circuit 105, the other end of the impedance 116 is connected to the drain terminal of the FET 117, the source terminal of the FET 117 is connected to ground, and the gate terminal of the FET 117 is connected to the sequencer 109. Also, the modulation circuit 110 is connected to the loop coil 103 constituting the above-described resonance circuit. The modulation circuit 110 employs so-called load modulation in which the FET 117 is caused to perform a switching operation in parallel in response to a signal from the sequencer 109 in order to change load of the impedance 116 on the loop coil 103.

On the other hand, the value transmission/reception part 15 includes a modulation circuit 202 and a demodulation circuit 203 for modulating and demodulating data, respectively, and a reader/writer-antenna circuit 204 for transmitting and receiving data by the coupling with an electromagnetic field. A control circuit 201 totally controls the modulation and the demodulation of the data to be transmitted and received. The demodulation circuit 203 may be provided with a protection circuit for reducing the signal if a large signal is input.

The control circuit 201 corresponds to the controller 16 in FIGS. 7 to 9. For example, the control circuit 201 generates a control signal for various controlling in order to control the modulation circuit 202 and the demodulation circuit 203 in accordance with an external command and an internal program, and generates transmission data corresponding to the command to supply the data to the modulation circuit 202. Also, the control circuit 201 generates reproduction data based on the response data from the demodulation circuit 203 to output the data.

In the modulation circuit 202, the transmission data input from the control circuit 201 is modulated by a transmitter, and this modulated signal is supplied to the reader/writer-antenna circuit 204. The demodulation circuit 203 demodulates the modulated wave from the reader/writer-antenna circuit 204, and supplies the demodulated data to the control circuit 201.

The reader/writer-antenna circuit 204 includes a loop-coil produced by winding a conducting wire in a planar state. The reader/writer-antenna circuit 204 emits the electromagnetic field corresponding to the modulated wave supplied from the modulation circuit 202, and detects the load change of the loop coil 103 of the value transmission/reception part 24.

In the value transmission/reception parts 15 and 24 constructed as described above, when predetermined data is instructed to be written, the control circuit 201 generates a command signal for writing based on this instruction and generates the transmission data (write data) corresponding to the instruction to supply the data to the modulation circuit 202. The modulation circuit 202 modulates the amplitude of the oscillation signal based on the input signal, and supplies the signal to the reader/writer-antenna circuit 204. The reader/writer-antenna circuit 204 emits electromagnetic wave corresponding to the input modulation signal.

The resonant frequency of the parallel resonant antenna circuit including the loop coil 103 and the capacitor 104 of the recipient is set to the value (in this specific example, 13.56 MHz) corresponding to the oscillation frequency (carrier frequency) from the reader/writer 15. Accordingly, the parallel resonant antenna circuit receives the emitted electromagnetic field by resonant operation, converts the received electromagnetic field into electrical signal, and then supplied the signal to the IC 102.

The electrical signal converted from the electromagnetic field by the loop-coil antenna 101 is input into the rectifier circuit 105 to be rectified and smoothed, and then is supplied to the regulator 106. The regulator 106 restrains and stabilizes a voltage variation (data component) of the electrical signal supplied from the rectifier circuit 105, and then supplies the signal as a direct current power to the sequencer 109.

Also, the signal rectified and smoothed by the rectifier circuit 105 is supplied to HPF 107 through the modulation circuit 110, the high-frequency component thereof is extracted, and then is supplied to the demodulation circuit 108. The demodulation circuit 108 demodulates the signal of the input high-frequency component, and supplies the signal to the sequencer 109. The sequencer 109 stores the input signal (command) input from the demodulation circuit 108 into the RAM, analyzes this in accordance with the program contained in the ROM. The sequencer 109 writes the write data supplied from the demodulation circuit 108 into the memory 22 based on the result obtained from the analysis.

On the other hand, if the signal (command) input from the demodulation circuit 108 is a read instruction, the sequencer 109 reads the read data corresponding to the instruction from the memory 22. Also, for the sequencer 109, the FET 117 of the modulation circuit 110 is caused to perform a switching operation corresponding to the read data. That is to say, in the modulation circuit 110, when the FET 117 is turned on, the impedance 116 and the loop coil 103 are connected in parallel. When the FET 117 is turned off, the parallel connection of the impedance 116 and the loop coil 103 is released.

As a result, the impedance of the reader/writer-antenna circuit 204 which is magnetically coupled with the loop-coil antenna 101 of the mobile phone 10 changes corresponding to the read data. Accordingly, the terminal voltage of the reader/writer-antenna circuit 204 changes in accordance with the change of the impedance. The sender can receive the read data by the demodulation circuit 203 demodulating this variation. As described above, the writing and the reading of data between the mobile phone 10, which is a sender, and the mobile phone 20, which is a recipient are performed in a noncontact manner.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of transmitting electronic value information for transferring electronic value information between terminals, the method comprising the steps of:
   authenticating each other between a transmission source terminal being a transmission source of the electronic value information and a transmission destination terminal being a transmission destination using common authentication information;
   sharing authentication for sharing common information obtained by the authentication between the transmission source terminal and the transmission destination terminal;
   encrypting data including the electronic value information to be transmitted from the transmission source terminal to the authenticated transmission destination terminal;
   transferring value information for transmitting the electronic value information encrypted in the step of encrypting to the transmission destination terminal when the transmission source terminal and the transmission destination terminal are recognized with each other in the step of authenticating;
   temporarily invalidating the electronic value information left in the transmission source terminal;
   transmitting reception confirmation for returning reception confirmation to the transmission source terminal when the transmission destination terminal completes reception of the electronic value information;
   deleting value information for deleting the invalidated electronic value information left in the transmission source terminal when the transmission source terminal receives the reception confirmation;
   transmitting validation information to the transmission destination terminal after the deletion of the electronic value information in order to validate the electronic value information; and
   validating value information for receiving the validation information and validating the electronic value information by the transmission destination terminal.

2. The method of transmitting electronic value information according to claim 1,
   wherein the step of encrypting encrypts all the data transmitted and received between the transmission source terminal and the transmission destination terminal using the common information shared in the step of sharing authentication.

3. The method of transmitting electronic value information according to claim 1,
   wherein the step of deleting value information deletes electronic value information left in the transmission source terminal before the transfer and all the information related to the electronic value information.

4. The method of transmitting electronic value information according to claim 1,
   further comprising the step of encrypting value information for encrypting the electronic value information using the authentication information,
   wherein electronic value information encrypted in the step of encrypting value information is transmitted to the transmission destination terminal in the step of transferring value information.

5. The method of transmitting electronic value information according to claim 4,
further comprising the step of decrypting the encrypted electronic value information using the authentication information after the step of transmitting reception confirmation by the transmission destination terminal.

6. The method of transmitting electronic value information according to claim 1,
wherein the authentication information is a common key determined between electronic-value-information transfer terminals, and all the data transmitted and received in the step of authenticating is encrypted by the common key.

7. The method of transmitting electronic value information according to claim 1,
wherein in the step of authenticating, the transmission source terminal and the transmission destination terminal authenticate with each other using a predetermined public key, unique information provided for the transmission source terminal being a transmission source and each terminal of the transmission destination terminals, and then the transmission source terminal generates a session key, and the generated session key is used as authentication information.

8. The method of transmitting electronic value information according to claim 1,
wherein in the step of deleting value information, the invalidated electronic value information left in the transmission source terminal and all the information related to the electronic value information are deleted, and then in the step of transmitting validation information, validation information for validating the electronic value information is transmitted to the transmission destination terminal.

9. The method of transmitting electronic value information according to claim 1,
further comprising the step of determining disruption for determining communication disruption between the transmission source terminal and the transmission destination terminal,
wherein the transmission source terminal and the transmission destination terminal are provided with unique information, a counter indicating which processing stage the processing is in and the unique information are transmitted and received with each other in the steps of authenticating, transferring value information, and transmitting reception confirmation, and completion notification indicating completion of the steps of authenticating, transferring value information, and transmitting reception confirmation is transmitted and received,
in the step of determining disruption, when one of the terminals fails to receive the completion notification, a determination is made that communication between the terminals is disrupted and a step, indicated by the counter, of which the completion notification has failed to be received between the terminals having the unique information is repeated.

10. A method of transmitting electronic value information for transferring electronic value information between terminals, the method comprising the steps of:
authenticating each other between a transmission source terminal being a transmission source of the electronic value information and a transmission destination terminal being a transmission destination using common authentication information;
sharing authentication for sharing common information obtained by the authentication between the transmission source terminal and the transmission destination terminal;
dividing the electronic value information into transmission units having no meaning as electronic value information;
transferring value information for transmitting one transmission unit generated in the step of dividing the electronic value information when the terminals are recognized with each other in the step of authenticating;
transmitting reception confirmation for returning reception confirmation to the transmission source terminal when the transmission destination terminal receives the transmission unit;
deleting unit information for deleting the one transmission unit left in the transmission source terminal when the transmission source terminal receives the reception confirmation;
wherein when the transmission source terminal receives the reception confirmation, a next transmission unit subsequent to the one transmission unit is transmitted, when the transmission destination terminal receives the next transmission unit, a next transmission unit left in the transmission source terminal is deleted, and when the transmission units of the electronic value information are completely transferred, the electronic value information is reconstructed.

11. The method of transmitting electronic value information according to claim 10,
wherein the step of transferring value information for transmitting the transmission units divided in the step of dividing the electronic value information to the transmission destination terminal in sequence, the step of transmitting reception confirmation, and the step of deleting unit information include the step of determining disruption for determining communication disruption between the transmission source terminal and the transmission destination terminal,
the transmission source terminal and the transmission destination terminal are provided with unique information to each terminal, the step of transferring value information and the step of transmitting reception confirmation transmit and receive a counter for distinguishing a transmission unit and unique information of the terminal with each other, and the transmission destination terminal transmits completion notification indicating completion of the reception of each transmission unit to the transmission source terminal,
when the transmission source terminal fails to receive the completion notification in the step of transferring value information and the step of transmitting reception confirmation, the step of determining disruption determines an occurrence of communication disruption between the terminals, and the step of transferring a transmission unit, indicated by a counter, having the completion notification failed to be received is repeated.

12. A method of transmitting electronic value information for transferring electronic value information between terminals, the method comprising the steps of:
authenticating each other between a transmission source terminal being a transmission source of the electronic value information and a transmission destination terminal being a transmission destination using common authentication information;

sharing authentication for sharing common information obtained by the authentication between the transmission source terminal and the transmission destination terminal;

generating a random number;

encrypting value information for encrypting the electronic value information using the random number generated in the step of generating a random number when the terminals are recognized with each other in the step of authenticating;

encrypting data including the electronic value information to be transmitted from the transmission source terminal to the authenticated transmission destination terminal;

transferring value information for transmitting the electronic value information encrypted in the step of encrypting when the transmission source terminal and the transmission destination terminal are recognized with each other in the step of authenticating;

invalidating for temporarily invalidating or deleting the electronic value information left in the transmission source terminal;

transmitting reception confirmation for returning reception confirmation to the transmission source terminal when the transmission destination terminal completes reception of the electronic value information;

transmitting the random number to the transmission destination terminal after completion of invalidating the electronic value information left in the transmission source terminal in the step of invalidating;

decrypting the encrypted electronic value information using the random number; and deleting value information for deleting the invalidated electronic value information left in the transmission source terminal when the transmission destination terminal decrypts the electronic value information.

13. An electronic value-information transmission system for transferring electronic value information between terminals, wherein a transmission source terminal to be a transmission source of the electronic value information includes transmission-destination terminal authentication means for performing mutual authentication with a transmission destination terminal being a transmission destination of the electronic value information using common authentication information;

transmission and receiving means for transmitting the electronic value information to the transmission destination terminal when the transmission-destination terminal authentication means authenticates the transmission destination and for receiving reception confirmation for the encrypted electronic value information;

invalidation means for temporarily invalidating the electronic value information left in the transmission source terminal after transmission of the electronic value information;

value-information deleting means for deleting the invalidated electronic value information and all the information related to the electronic value information when the reception confirmation of the electronic value information is received; and information-validation control means for the transmission destination terminal generating validation information in order to validate the electronic validation information after deleting the electronic value information, the transmission destination terminal to be a transmission destination of the electronic value information includes transmission-source terminal authenticating means for authenticating the transmission source terminal using the authentication information with the transmission source terminal;

transmission and receiving means for receiving encrypted electronic value information transmitted from the transmission source terminal and for transmitting reception confirmation for receiving the electronic value information to the transmission source terminal;

decrypting value information means for decrypting the encrypted electronic value information using the authentication information; and validating value information means for validating the decrypted electronic validation information based on the validation information.

14. The electronic value-information transmission system according to claim 13, further comprising value-information encrypting means for encrypting the electronic value information using the authentication information when the transmission-destination terminal authentication means authenticates the transmission destination, wherein the transmission and receiving means transmits the electronic value information encrypted in the value-information encrypting means to the transmission destination terminal.

15. The electronic value-information transmission system according to claim 13, wherein the value-information deleting means deletes electronic value information left in the transmission source terminal before the transfer and all the information related to the electronic value information.

16. An electronic value-information transmission system for transferring electronic value information between terminals, wherein a transmission source terminal to be a transmission source of the electronic value information includes transmission-destination terminal authentication means for performing mutual authentication with a transmission destination terminal being a transmission destination of the electronic value information using common authentication information;

value-information dividing means for dividing the electronic value information into transmission units having no meaning as electronic value information when the transmission-destination terminal authentication means authenticates the transmission destination terminal;

transmission and receiving means for transmitting divided electronic value information by the value-information dividing means to the transmission destination terminal and receiving reception confirmation for the divided electronic value information; and value-information deleting for deleting the transmission unit left in the terminal when the transmission source terminal receives the reception confirmation of the electronic value information, the transmission destination terminal to be a transmission destination of the electronic value information includes transmission-source terminal authenticating means for authenticating the transmission source terminal using the authentication information with the transmission source terminal; and transmission and receiving means for receiving divided electronic value information transmitted from the transmission source terminal and for transmitting reception confirmation for receiving the electronic value information to the transmission source terminal, wherein when the transmission source terminal receives the reception confirmation, a transmission unit next to the transmission unit is transmitted, when the transmission destination terminal receives the next transmission unit, the next transmission unit left in the transmission source terminal is deleted, and when the transmission unit of the electronic value information is completely transferred, the electronic value information is reconstructed.

17. An electronic value-information transmission system for transferring electronic value information between terminals, wherein a transmission source terminal to be a transmission source of the electronic value information includes transmission-destination terminal authentication means for performing mutual authentication with a transmission destination terminal being a transmission destination of the electronic value information using common authentication information;

random-number generating means for generating a random number;

value-information encrypting means for encrypting the electronic value information using the random number generated by the random-number generating means when the transmission destination terminal is recognized by the transmission-destination terminal authentication means;

transmission and receiving means for transmitting encrypted electronic value information by the value-information dividing means to the transmission destination terminal and receiving reception confirmation for the encrypted electronic value information;

invalidating means for temporarily invalidating or deleting the electronic value information left in the transmission source terminal when receiving reception confirmation from the transmission destination terminal;

random-number transmitting means for transmitting the random number to the transmission destination terminal after completion of invalidating the electronic value information left in the transmission source terminal by the invalidating means; and value-information deleting means for deleting the invalidated electronic value information left in the transmission source terminal when the transmission destination terminal decrypts the electronic value information, and the transmission destination terminal to be a transmission destination of the electronic value information includes transmission-source terminal authenticating means for authenticating the transmission source terminal using the authentication information with the transmission source terminal;

transmission and receiving means for receiving encrypted electronic value information transmitted from the transmission source terminal and for transmitting reception confirmation for receiving the electronic value information to the transmission source terminal; and value-information decrypting means for decrypting the encrypted electronic value information using the random number, wherein the transmission source terminal receives reception confirmation of the encrypted electronic value information from the transmission source terminal, invalidates or deletes the electronic value information, then transmits the random number used for encryption of the electronic value information, and the transmission destination terminal decrypts the electronic value information.

* * * * *